(12) United States Patent
Talbert

(10) Patent No.: US 7,066,302 B1
(45) Date of Patent: Jun. 27, 2006

(54) EXTENSIBLE BRAKE WEAR GAUGE

(76) Inventor: Christopher M. Talbert, 1028 Christmas La., Gambrills, MD (US) 21054

( * ) Notice: Subject to any disclaimer, the term of this patent is extended or adjusted under 35 U.S.C. 154(b) by 67 days.

(21) Appl. No.: 10/894,182

(22) Filed: Jul. 19, 2004

(51) Int. Cl.
*F16D 66/02* (2006.01)
(52) U.S. Cl. .............................. 188/1.11 W
(58) Field of Classification Search .......... 188/1.11 R, 188/1.11 W, 1.11 L, 1.11 E, 382; 73/121, 73/128, 865.8; 33/296, 297, 298, 227, 609, 33/610; 340/453, 454; 116/208
See application file for complete search history.

(56) References Cited

U.S. PATENT DOCUMENTS

| | | | |
|---|---|---|---|
| 3,660,905 A | 5/1972 | McFarland et al. | 33/148 R |
| 3,854,216 A | 12/1974 | Mosher | 33/181 AT |
| 4,594,785 A | 6/1986 | Carlson | 33/172 R |
| 4,989,537 A * | 2/1991 | Hutchinson et al. | 188/1.11 W |
| 4,991,310 A * | 2/1991 | Melia | 188/1.11 W |
| 5,178,092 A * | 1/1993 | Schedin | 188/1.11 W |
| 5,535,854 A | 7/1996 | Prince | 188/1.11 |
| 6,237,723 B1 | 5/2001 | Salsman | 188/1.11 W |

* cited by examiner

*Primary Examiner*—Thomas J. Williams
(74) *Attorney, Agent, or Firm*—Sturm & Fix LLP

(57) ABSTRACT

A wear gauge device (10) for use with disc brake systems having a boss (100) provided with a floating arm (101) and wear indicator pin (102) that track the thickness of brake lining material (104) wherein, the wear gauge device (10) includes an illumination member (40) mounted on one end of a telescoping support member (30) the other end of which is connected and disposed perpendicular to a wear plate member (20) having a plurality of different colored wear indicator segments (21) (22) (23) that are positionable behind the wear indicator pin (102) to obtain an estimate of the remaining amount of brake lining material (104).

4 Claims, 1 Drawing Sheet

EXTENSIBLE BRAKE WEAR GAUGE

BACKGROUND OF THE INVENTION

Cross Reference to Related Applications

Not applicable.

1. Field of the Invention

The present invention relates to the field of brake wear gauge constructions in general and in particular to a brake wear gauge specifically designed for relatively inaccessible locations.

2. Description of Related Art

As can be seen by reference to the following U.S. Pat. Nos. 6,237,723; 3,854,216; 5,535,854; 4,594,785; and, 3,660,905, the prior art is replete with myriad and diverse arrangements for determining the wear on brake pads and the like.

While all of the aforementioned prior art constructions are more than adequate for the basic purpose and function for which they have been specifically designed, they are uniformly deficient with respect to their failure to provide a simple, efficient, and practical brake wear gauge that is particularly suitable for relatively inaccessible locations to quickly and easily determine brake lining wear on pneumatic disc brake systems that utilize a conventional boss and pin measurement for assessing the extent of brake lining wear.

As most drivers of heavy duty tractor trailer rigs are all too well aware, trucks that employ pneumatic brake systems incorporating the caliper retention arrangement to indicate brake lining wear must be periodically checked as a routine safety regimen and invariably the boss and pin indicators are always located in relatively dark, cramped, and/or inaccessible locations.

As a consequence of the foregoing situation, there has existed a longstanding need among truckers, service personnel and the like for a new and improved extensible and illuminated brake wear gauge that can provide relatively easy visual access to a boss and pin wear indicator in a cramped environment; and, the provision of such an arrangement is the stated objective of the present invention.

BRIEF SUMMARY OF THE INVENTION

Briefly stated, the brake wear gauge that forms the basis of the present invention comprises in general a wear gauge plate mounted on one end of a telescoping support rod wherein, the other end of the telescoping support rod is provided with an illumination member in the form of a high intensity flashlight or the like.

As will be explained in greater detail further on in the specification, the wear gauge plate is disposed in a perpendicular orientation to the distal end of the telescoping support rod and further provided with different colored segments representative of minimal wear, extensive wear and excessive wear.

The telescoping support rod in conjunction with the illumination member assists the user in positioning the wear gauge plate behind the pin of a boss and pin wear indicator so that the person utilizing the brake wear gauge of this invention will be able to make a quick visual determination as to the level of brake lining wear that is represented by the pin wear indicator.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
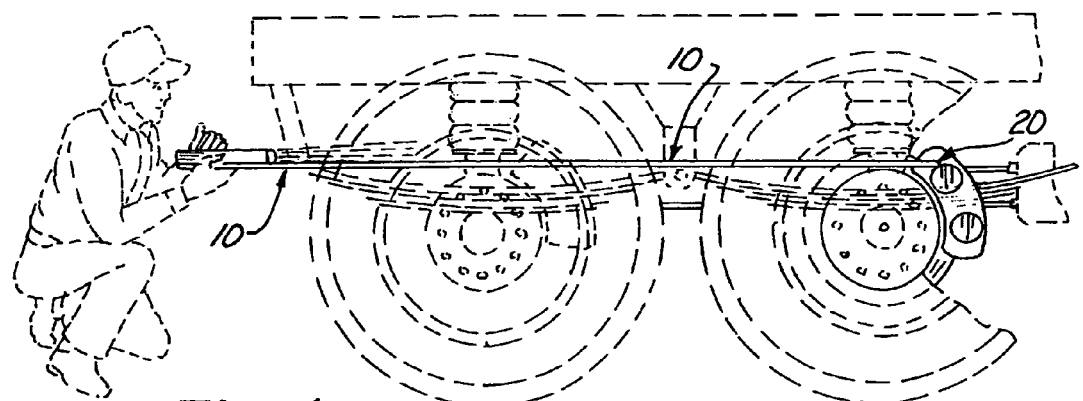
FIG. 1 is a perspective view of the extensible brake wear gauge that forms the basis of this invention.
Figure 2:
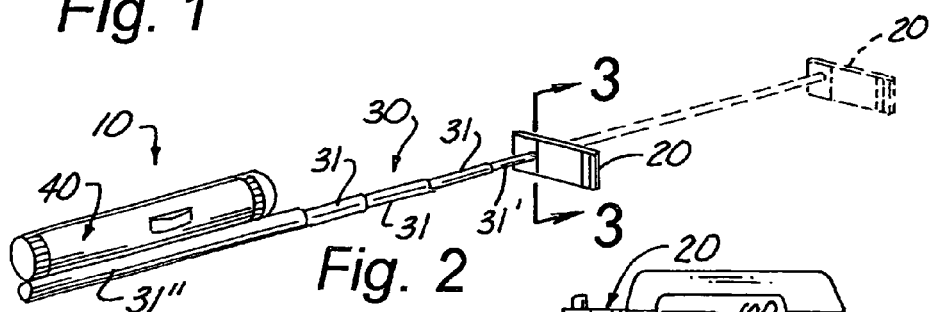
FIG. 2 is an isolated perspective view of the brake wear gauge.

As can be seen by reference to the drawings, and in particular to FIGS. 1 and 2, the extensible brake wear gauge device that forms the basis of the present invention is designated generally by the reference number 10. The device 10 comprises in general a wear indicator plate 20, a telescoping support shaft member 30 and an illumination member 40 which will now be described in seriatim fashion.

Figure 3:
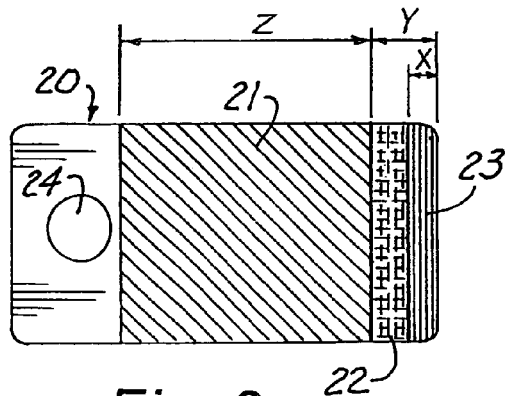
FIG. 3 is a top plan view of the wear gauge plate showing the differently colored wear indicator segments.

Turning now to FIG. 3, it can be seen that the wear plate member 20 has a generally flat elongated rectangular configuration and is provided with a plurality of differently colored wear indicator segments 21 22 23 colored green, yellow and red respectively wherein, the green wear indicator segment 21 occupies the intermediate portion of the inboard face of the plate member 20 and represents minimal to acceptable brake lining wear.

In addition, the distal end of the inboard face of the wear plate member 20 is occupied by a relatively narrow red wear indicator segment 23 that represents excessive brake lining wear and the yellow wear indicator segment 22 is disposed intermediate the green 21 and red 23 colored segments having a surface area comparable to the red segment 23 and this yellow segment 22 represents extensive yet marginally acceptable brake lining wear as will become apparent further on in the specification.

As is also shown in FIG. 3, in the preferred embodiments of the invention, the proximal end of the wear plate member 20 may optionally be provided with a mounting aperture 24 dimensioned to receive a portion of the telescoping support member 30.

Returning once more to FIG. 2, it can be seen that the telescoping support member 30 has a plurality of telescoping segments 31 to carry the effective length of the support member 30 in a well recognized fashion.

Furthermore, the narrowest telescoping segment 31' is optionally received through the mounting aperture 24 and fixedly secured to the wear plate member 20 to dispose the wear plate member 20 perpendicular to the longitudinal axis of the support member 30' and, the thickest telescoping segment 31" is fixedly secured to the illumination member 40 wherein, the beam of light from the illumination member is aligned parallel to the longitudinal axis of the support member 30 so that the light beam is focused on the wear plate member 20.

Figure 4:
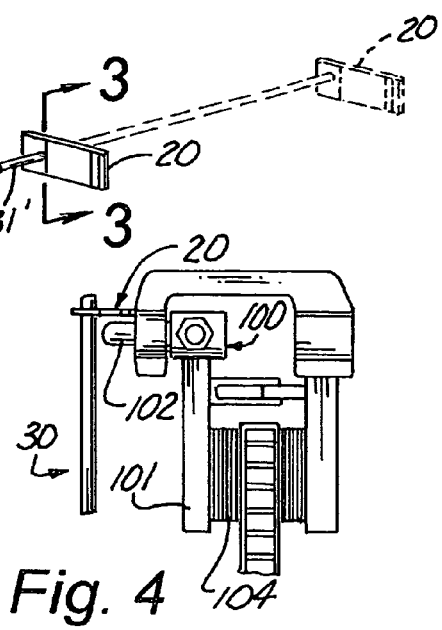
FIG. 4 is a detail view of the wear gauge plate disposed adjacent a wear pin indicator showing minimal brake lining wear; and, FIG. 5 is a detail view similar to FIG. 4 wherein, the wear pin indicator is registering excessive brake lining wear.
Figure 5:
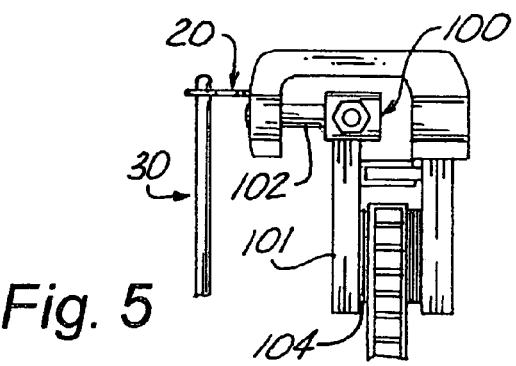

Turning now to FIGS. 4 and 5, it can be seen that the device 10 is employed by extending the telescoping support member 30, and turning on the illumination member 40 so that the focused beam of light from the illumination member 40 will assist the user in positioning the wear indicator plate 20 behind the wear pin 102 mounted on the floating arm 101 of a boss 100 wherein, the position of the wear pin 102 and the floating arm 101 are indicative of the amount of wear experienced by the brake pad lining material 104.

In FIG. 4, the wear pin 102 will extend well into the green colored wear segment 21 of the wear plate member 20 indicating an ample thickness of brake lining 104. However, as shown in FIG. 5, the wear pin 102 will extend well outside the green colored wear segment 21 warning the user that the time for replacement of the brake liner 104 is either approaching or has already arrived.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A brake wear gauge device for use on disc brakes provided with a boss and having a floating arm associated with brake pad lining material and carrying a wear pin which projects through the boss wherein the wear gauge device comprises
    a wear plate member provided with a plurality of differently colored wear indicator segments;
    a telescoping support member provided with a plurality of telescoping segments and having a distal end and a proximal end wherein, the distal end is connected and disposed perpendicular to the wear plate member; and,
    an illumination member connected to the proximal end of the support member and adapted to cast a beam of light onto the wear plate member.

2. The wear gauge device as in claim 1; wherein, one of the plurality of the wear indicator segments is an enlarged surface area segment that represents minimal to acceptable brake lining wear.

3. The wear gauge device as in claim 2; wherein, another of the plurality of the wear indicator segments is a reduced surface area segment that represents excessive brake lining wear.

4. The wear gauge device as in claim 3; wherein, yet another of the plurality of the wear indicator segments is also a reduced surface area segment that represents extensive brake lining wear.

* * * * *